US00RE48134E

(19) United States
(12) Reissued Patent
Gravely et al.

(10) Patent Number: US RE48,134 E
(45) Date of Reissued Patent: Jul. 28, 2020

(54) INTERCEPTOR SYSTEM FOR CHARACTERIZING DIGITAL DATA IN TELECOMMUNICATION SYSTEM

(71) Applicant: CommScope Technologies LLC, Hickory, NC (US)

(72) Inventors: Thomas B. Gravely, Herndon, VA (US); Morgan C. Kurk, Sachse, TX (US); Oluwatosin O. Osinusi, Bethesda, MD (US); Andrew E. Beck, Ashburn, VA (US); Patrick Boyle, Centreville, VA (US)

(73) Assignee: CommScope Technologies LLC, Hickory, NC (US)

(21) Appl. No.: 15/491,914

(22) Filed: Apr. 19, 2017

Related U.S. Patent Documents

Reissue of:
(64) Patent No.: 9,014,052
Issued: Apr. 21, 2015
Appl. No.: 13/835,652
Filed: Mar. 15, 2013

U.S. Applications:
(60) Provisional application No. 61/752,035, filed on Jan. 14, 2013.

(51) Int. Cl.
*H04W 24/02* (2009.01)

(52) U.S. Cl.
CPC ..... *H04W 24/02* (2013.01)

(58) Field of Classification Search
CPC ..... H04W 24/02
(Continued)

(56) References Cited

U.S. PATENT DOCUMENTS 6,304,594 B1 10/2001 Salinger
7,529,215 B2 5/2009 Osterling
(Continued)

FOREIGN PATENT DOCUMENTS

EP 2381597 10/2011
EP 2521418 11/2012
(Continued)

OTHER PUBLICATIONS

Zhan et al., "Exploration for the Calibration of Passive Intermodulation Analyzer", IEEE, The Eighth International Conference on Electronic Measurement and Instruments, pp. 46-49. (Year: 2007).*
(Continued)

*Primary Examiner* — Eron J Sorrell
(74) *Attorney, Agent, or Firm* — Fogg & Powers LLC

(57) ABSTRACT

Certain aspects are directed to an interceptor system for characterizing digital data communicated between certain points in a telecommunication system. The interceptor system includes an interface device and a processing device. The interface device can retrieve data from at least one communication link between a radio frequency processing unit and a baseband processing unit of a telecommunication system. The data includes digital data communicated between the radio frequency processing unit and the baseband processing unit. The processing device can determine an interface link protocol for communicating with terminal equipment via the telecommunication system. The interface link protocol can be determined based on an organization of the data retrieved from the communication link.

34 Claims, 8 Drawing Sheets

(58) Field of Classification Search
USPC ..... 370/252, 254, 328, 335, 345
See application file for complete search history.

(56) References Cited

U.S. PATENT DOCUMENTS

| | | | | |
|---|---|---|---|---|
| 7,555,669 | B2 * | 6/2009 | Wong et al. | 713/600 |
| 7,571,338 | B2 | 8/2009 | Österling et al. | |
| 7,646,751 | B2 | 1/2010 | Osterling et al. | |
| 7,680,149 | B2 | 3/2010 | Liu et al. | |
| 7,937,110 | B2 | 5/2011 | Wu et al. | |
| 8,005,152 | B2 | 8/2011 | Wegener | |
| 8,018,910 | B2 | 9/2011 | Jiang et al. | |
| 8,050,296 | B2 | 11/2011 | Österling | |
| 8,194,597 | B2 | 6/2012 | Feder et al. | |
| 8,199,659 | B2 * | 6/2012 | Mergler et al. | 370/252 |
| 8,204,144 | B2 | 6/2012 | Takada et al. | |
| 8,346,091 | B2 | 1/2013 | Kummetz et al. | |
| 8,363,741 | B2 | 1/2013 | Patanapongpibul et al. | |
| 8,437,315 | B2 * | 5/2013 | Kostic et al. | 370/335 |
| 8,903,324 | B1 * | 12/2014 | Bradley | H04B 17/345 455/67.11 |
| 9,014,052 | B2 | 4/2015 | Gravely et al. | |
| 10,038,522 | B1 | 7/2018 | Ju et al. | |
| 2002/0094785 | A1 | 7/2002 | Deats | |
| 2003/0122534 | A1 | 7/2003 | Seppinen et al. | |
| 2004/0037285 | A1 * | 2/2004 | Viero et al. | 370/392 |
| 2005/0095986 | A1 * | 5/2005 | Hassan | H04W 16/14 455/67.13 |
| 2005/0249221 | A1 | 11/2005 | Remi et al. | |
| 2007/0171866 | A1 | 7/2007 | Merz et al. | |
| 2008/0008122 | A1 * | 1/2008 | Yoon | 370/328 |
| 2008/0011171 | A1 | 1/2008 | Schneider et al. | |
| 2008/0013480 | A1 * | 1/2008 | Kapoor | H04W 36/06 370/328 |
| 2008/0037435 | A1 * | 2/2008 | Sankala | H04L 43/18 370/250 |
| 2008/0102897 | A1 | 5/2008 | Song et al. | |
| 2008/0144522 | A1 | 6/2008 | Chang et al. | |
| 2008/0181171 | A1 | 7/2008 | Koziy et al. | |
| 2009/0149221 | A1 * | 6/2009 | Liu et al. | 455/561 |
| 2010/0022251 | A1 | 1/2010 | Watanabe et al. | |
| 2010/0029282 | A1 | 2/2010 | Stamoulis et al. | |
| 2010/0085061 | A1 | 4/2010 | Bradley et al. | |
| 2010/0121897 | A1 | 5/2010 | Bal et al. | |
| 2010/0329404 | A1 | 12/2010 | Xiang et al. | |
| 2011/0032910 | A1 | 2/2011 | Aarflot et al. | |
| 2011/0119550 | A1 | 5/2011 | Fantaske | |
| 2011/0190005 | A1 | 8/2011 | Cheon et al. | |
| 2011/0234336 | A1 | 9/2011 | Hershtig | |
| 2011/0310810 | A1 | 12/2011 | Kenington et al. | |
| 2012/0009948 | A1 * | 1/2012 | Powers | G01S 5/0221 455/456.5 |
| 2012/0057572 | A1 | 3/2012 | Evans et al. | |
| 2012/0113972 | A1 | 5/2012 | Liu et al. | |
| 2012/0236818 | A1 | 9/2012 | Kaminski et al. | |
| 2012/0250740 | A1 | 10/2012 | Ling | |
| 2013/0055286 | A1 * | 2/2013 | Griffioen | H04W 88/08 719/313 |
| 2013/0071112 | A1 * | 3/2013 | Melester | H04B 17/0085 398/38 |
| 2013/0100823 | A1 | 4/2013 | Ren et al. | |
| 2013/0272170 | A1 * | 10/2013 | Chatterjee | H04W 28/02 370/280 |
| 2014/0003314 | A1 | 1/2014 | Shu et al. | |
| 2014/0049267 | A1 * | 2/2014 | Cordaro | G01R 23/20 324/624 |
| 2014/0119197 | A1 | 5/2014 | Maca et al. | |
| 2014/0185601 | A1 * | 7/2014 | Ilyadis | H04W 28/06 370/338 |
| 2014/0198684 | A1 | 7/2014 | Gravely et al. | |
| 2014/0369311 | A1 | 12/2014 | Bi et al. | |
| 2014/0378047 | A1 | 12/2014 | Kennard | |
| 2015/0023194 | A1 | 1/2015 | Seo et al. | |
| 2015/0084782 | A1 | 3/2015 | Zhang et al. | |
| 2015/0133111 | A1 | 5/2015 | Bevan et al. | |
| 2015/0257165 | A1 | 9/2015 | Gale et al. | |
| 2015/0271003 | A1 | 9/2015 | Kuchi et al. | |
| 2016/0074005 | A1 | 3/2016 | Corl | |
| 2016/0157115 | A1 | 6/2016 | Kim et al. | |
| 2016/0352369 | A1 | 12/2016 | Smith | |
| 2016/0380668 | A1 | 12/2016 | Aoki et al. | |
| 2017/0214370 | A1 | 7/2017 | Tseng et al. | |
| 2017/0245162 | A1 | 8/2017 | Beck et al. | |
| 2017/0257833 | A1 | 9/2017 | Hannan et al. | |
| 2018/0070254 | A1 | 3/2018 | Hannan et al. | |
| 2018/0248576 | A1 | 8/2018 | Coe et al. | |
| 2018/0337718 | A1 | 11/2018 | Srinivasan | |

FOREIGN PATENT DOCUMENTS

| | | | | |
|---|---|---|---|---|
| EP | 2521418 | A1 | 11/2012 | |
| WO | WO-2011072595 | A1 * | 6/2011 | H04W 88/085 |
| WO | 2012062080 | | 5/2012 | |
| WO | 2012062080 | A1 | 5/2012 | |
| WO | 2012116007 | | 8/2012 | |
| WO | 2012116007 | A1 | 8/2012 | |
| WO | 2012171133 | | 12/2012 | |
| WO | 2015133952 | | 9/2015 | |
| WO | 2017072552 | A1 | 5/2017 | |
| WO | 2017151460 | A1 | 9/2017 | |

OTHER PUBLICATIONS

United States Patent and Trademark Office, "Notice of Allowance", "From U.S. Appl. No. 13/835,652", dated Dec. 19, 2014, pp. 1-7, Published in: US.

European Patent Office, "Communication Pursuant to 94(3) for EP Application No. 13870842.5", "Foreign Counterpart to U.S. Appl. No. 13/835,652", dated Jan. 29, 2018, pp. 1-5, Published in: EP.

European Patent Office, "Extended European Search Report from EP Application No. 13870842.5 dated Aug. 10, 2016", "from Foreign Counterpart of U.S. Appl. No. 13/835,652", dated Aug. 10, 2016, pp. 1-9, Published in: EP.

U.S. Patent and Trademark Office, "Office Action", "U.S. Appl. No. 13/835,652", dated Aug. 20, 2014, pp. 1-7.

Patent Cooperation Treaty, "International Search Report and Written Opinion, from PCT Application No. PCT/US2013/032030, dated Oct. 18, 2013", "from Foreign Counterpart of U.S. Appl. No. 13/835,652", dated Oct. 18, 2013, pp. 1-8, Published in: WO.

Altera Corporation, "Implementing the CPRI Protocol Using the Deterministic Latency Transceiver PHY IP Core", "Altera Corporation", Jan. 2012, pp. 1-16, Published in: San Jose, CA.

CommScope, Inc., "Optical PIM Tester", Nov. 10, 2015, pp. 1-2.

Chun-Hui et al., "Research of CPRI Protocol Based on High-Speed Fiber Link", "2010 Second International Conference on Information Technology and Computer Science", 2010, pp. 336-339, Publisher: IEEE Computer Society.

CommScope, Inc., "Optical PIM Tester", 2015, pp. 1-4, Publisher: CommScope, Inc.

CommScope, Inc., "User Manual for Optical PIM Tester", Dec. 2015, pp. 1-49, Publisher: CommScope, Inc.

Samardzija et al., "Compressed Transport of Baseband Signals in Radio Access Networks", "IEEE", Sep. 2012, pp. 3216-3225, vol. 11, No. 9, Publisher IEEE Transactions on Wireless Communications.

Hannan, "Signal Power/Quality Measurement From Digital RF/IF Interface", "U.S. Appl. No. 15/249,027, filed Aug. 26, 2016", Aug. 26, 2016, pp. 1-31, Published in: US.

Hannan et al., "Signal Detection From Digital Interface", "U.S. Appl. No. 15/335,235, filed Oct. 26, 2016", Oct. 26, 2016, pp. 1-37, Published in: US.

Beck et al., "Passive Intermodulation (PIM) Testing in Distributed Base Transceiver Station Architecture", "U.S. Appl. No. 15/430,211, filed Feb. 10, 2017", Feb. 10, 2017, pp. 1-35.

Patent Cooperation Treaty, "Notification of Transmittal of the International Search Report and the Written Opinion of the International Search Authority, or the Declaration, from PCT Application

(56) References Cited

OTHER PUBLICATIONS

No. PCT/US2016/068108, dated Apr. 7, 2017", "from Foreign Counterpart of U.S. Appl. No. 62/270,362", Apr. 7, 2017, pp. 1-14, Published in: PCT.
European Patent Office, "Summons to attend oral proceedings pursuant to Rule 115(1) from EP Application No. 13870842.5 mailed Feb. 21, 2019", from Foreign Counterpart to U.S. Appl. No. 13/835,652, pp. 1-6, Published: EP.
U.S. Patent and Trademark Office, "Office Action", U.S. Appl. No. 15/335,235, dated Mar. 28, 2019, pp. 1-33, Published: US.
Fugal, "Conceptual Wavelets in Digital Signal Processing: An In-Depth, Practical Approach for the Non-Mathematician", www.conceptualwavelets.com, 2009, pp. 1-100, Space & Signals Technologies LLC.
Gardner, "Cyclostationary in Communications and Signal Processing", The Institute of Electrical and Electronics Engineers, 1994, pp. 1-260, IEEE Communications Society.
Gardner, "Exploitation of Spectral Redundancy in Cyclostationary Signals", IEEE Signal Processing Magazine, Apr. 1991, pp. 1-24, IEEE.
International Bureau, "International Preliminary Report on Patentability from PCT Application No. PCT/US2013/032030 dated Jul. 14, 2015", from Foreign Counterpart to U.S. Appl. No. 13/835,652, dated Jul. 14, 2015, pp. 1-8, Published: WO.
International Bureau, "International Preliminary Report on Patentability from PCT Application No. PCT/US2017/019586 dated Sep. 13, 2018", from Foreign Counterpart to U.S. Appl. No. 15/335,235, dated Sep. 13, 2018, pp. 1-12, Published: WO.
International Searching Authority, "International Search Report and Written Opinion from PCT Application No. PCT/US2017/019586 dated May 26, 2017", from Foreign Counterpart to U.S. Appl. No. 15/335,235, dated May 26, 2017, pp. 1-15, Published: WO.
U.S. Patent and Trademark Office, "Decision on Petition", U.S. Appl. No. 13/835,652, Mar. 15, 2016, pp. 1-2, Published: US.
U.S. Patent and Trademark Office, "Restriction Requirement", U.S. Appl. No. 15/335,235, dated Nov. 29, 2018, pp. 1-6, Published: US.
U.S. Patent and Trademark Office, "Final Office Action", U.S. Appl. No. 15/335,235, dated Aug. 15, 2019, pp. 1-21, Published: US.
European Patent Office, "Decision to refuse a European Patent application from EP Application No. 13870842.5", from Foreign Counterpart to U.S. Appl. No. 13/835,652, dated Oct. 29, 2019, pp. 1-16, Published: EP.
U.S. Patent and Trademark Office, "Office Action", U.S. Appl. No. 15/430,211, dated Jun. 24, 2019, pp. 1-45, Published: US.
U.S. Patent and Trademark Office, "Office Action", U.S. Appl. No. 15/691,615, dated Jun. 12, 2019, pp. 1-39, Published: US.
International Patent Application No. PCT/US2013/032030, International Search Report and Written Opinion mailed Oct. 18, 2013, 9 pages.

* cited by examiner

INTERCEPTOR SYSTEM FOR CHARACTERIZING DIGITAL DATA IN TELECOMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 9,014,052* (*the '052 Patent*). *The '052 Patent* claims priority to U.S. Provisional Application Ser. No. 61/752,035 filed *on* Jan. 14, 2013 and titled "Remote Radio Head System Interface for Processing of Digital Data," the contents of which are hereby incorporated by reference.

TECHNICAL FIELD

The present invention relates generally to telecommunications systems and more particularly (although not necessarily exclusively) to characterizing digital data communicated between certain points in a telecommunication system communication system.

BACKGROUND

Standardized mobile wireless communication protocols may establish peer-to-peer communications between two physical layer entities at the bottom layer of the protocol stack. In a mobile wireless system, this interaction can occur across an air interface between a physical layer entity on the network side, such as a base station, and terminal equipment such as a mobile communication device in a coverage area serviced by the remote radio head.

A base station or other physical layer entity on the network side may be partitioned into distinct modules that perform different functions on the physical layer data. For example, base station functions may be partitioned into a base transceiver system that includes a radio equipment controller ("REC") and remote radio head ("RRH"). The RRH and the REC can perform complementary functions and exchange digitized physical layer data over one or more communication links. The REC can perform demodulation and baseband processing. The RRH can perform radio frequency processing on the data.

Physical layer data may be communicated between different modules of a base transceiver system. The physical layer data may lack any identifying characteristics or parameters that can be used to discriminate among digital data belonging to the different frequency channels and antennas. Examples of such identifying characteristics or parameters include the RF channels associated with different sets of physical layer data, sample width, oversampling rate, frame markers, slot markers, and the like.

Systems and method are desirable for independently characterizing digital physical layer data communicated between distributed physical layer entities in a telecommunication system.

SUMMARY

Certain aspects and features of the present invention are directed to characterizing digital data communicated between certain points in a telecommunication system.

In one aspect, an interceptor system is provided. The interceptor system includes an interface device and a processing device. The interface device can retrieve data from at least one communication link between a radio frequency processing unit and a baseband processing unit of a telecommunication system. The data includes digital data communicated between the radio frequency processing unit and the baseband processing unit. The processing device can determine an interface link protocol for communicating with terminal equipment via the telecommunication system. The interface link protocol can be determined based on identifying an organization of the data retrieved from the communication link.

In another aspect, a method is provided. The method involves retrieving data from at least one communication link between a radio frequency processing unit and a baseband processing unit of a telecommunication system. The data includes digital data communicated between the radio frequency processing unit and the baseband processing unit. The method further involves determining an interface link protocol for communicating with terminal equipment via the telecommunication system. The interface link protocol can be determined based on analyzing an organization of the data retrieved from the communication link.

DETAILED DESCRIPTION

Figure 1:
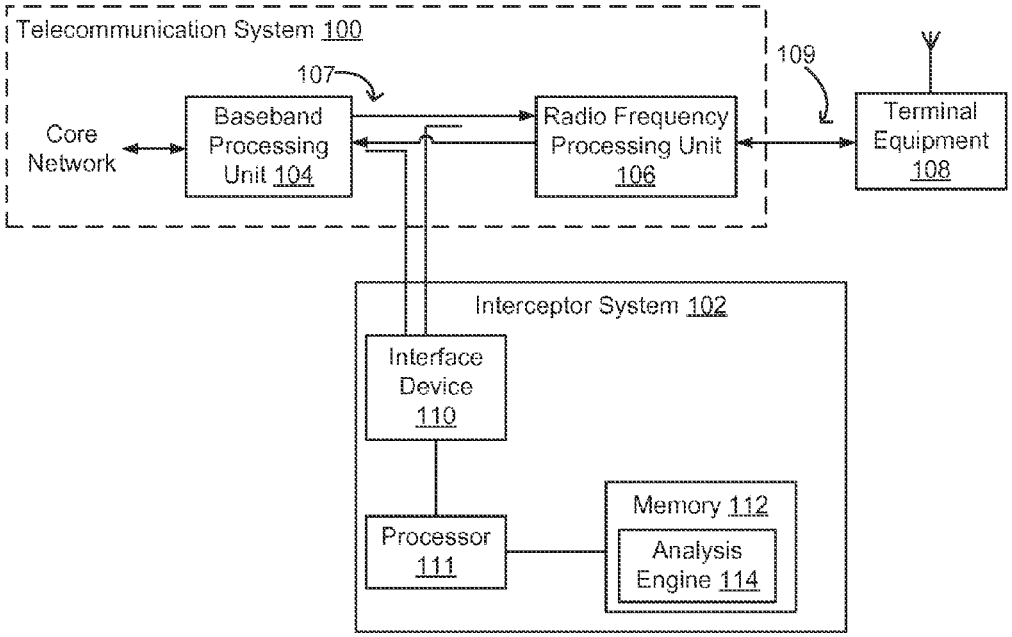
FIG. 1 is a block diagram of an example interceptor system that can analyze data communicated between a baseband processing unit and a radio frequency processing unit of a telecommunication system according to one aspect.

Systems and methods are disclosed for an interceptor system that can characterize digital data communicated between points in a mobile wireless communication system or other telecommunication system. The interceptor system may be external to the telecommunication system. The interceptor system can observe or interact with digital physical layer data as communicated via a communication link between devices, systems, or modules of a telecommunication system. The physical layer data may be downlink data to be communicated to terminal equipment over an air interface and/or uplink data received from terminal equipment via the air interface, such as data communicated via a remote radio head system for a telecommunication system.

In accordance with some aspects, the interceptor system can include an interface device and a processing device. The interface device can include any suitable device that can retrieve physical layer data communicated between a baseband processing unit and a radio frequency processing unit of a telecommunication system. A non-limiting example of a baseband processing unit is a radio equipment controller ("REC"). A non-limiting example of a radio frequency processing unit is a remote radio head ("RRH"). The baseband processing unit and the radio frequency processing unit can collectively provide a distributed base transceiver system. An interface between the baseband processing unit and the radio frequency processing unit devices can be equivalent to an internal interface of a base transceiver station. The form and/or the organization of the data communicated via the communication link between the baseband processing unit and the radio frequency processing unit can be defined by an interface specification for the interface between the baseband processing unit and the radio frequency processing unit. The interface device of the interceptor system can retrieve physical layer data and/or other data from the communication link between the radio frequency processing unit and the baseband processing unit. In some aspects, the processing device can identify an interface link protocol based on analyzing the data organization of the physical layer data. In other aspects, the processing device can identify an interface link protocol based on data communicated from an external data source, such as (but not limited to) data describing one or more aspects of the interface link protocol.

As used herein, the term "communication link" can include one or more physical connections providing a signal path between devices in a telecommunication system, such as (but not limited to) a baseband processing unit and a radio frequency processing unit. A communication link can include any type of communication medium over which signals can be communicated between devices in a telecommunication system. Non-limiting examples of suitable communication mediums include copper cable (such as a coaxial cable), optical fiber, and microwave link.

As used herein, the term "physical layer" can refer to a lowest layer of a networking model or communication standard. A physical layer can be a fundamental layer underlying the logical data structures of the higher level functions in a telecommunication system or other network.

As used herein, the term "data organization" can refer to a manner in which groups of signals, bits, or other data are sequenced in a digital data stream. Aspects of the data organization can include (but are not limited to) a mechanism and/or process for aggregating data associated with different cells in a telecommunication system, an order of transmission of data on a communication link, a mapping between specific data items and cells within a coverage area being serviced by a telecommunication system, etc. Aspects of the data organization can additional or alternatively include parameters corresponding to a given data format such as (but not limited to) sample width, oversampling rate, and/or any scrambling or encryption that may be applied to the data, etc.

As used herein, the term "interface link protocol" can refer to any communication protocol used for transferring physical layer data among co-located or distributed nodes situated on the same side of the air interface of a wireless system or other telecommunication system. Non-limiting examples of an interface link protocol include (but are not limited to) Common Packet Radio Interface ("CPRI"), Open Base Station Architecture Initiative ("OBSAI") and Open Radio Equipment Interface ("ORI").

In additional or alternative aspects, the interceptor system can perform additional operations based on characterizing the physical layer data, such as (but not limited to) system diagnostics, signal conditioning, providing interfaces to other system architectures, etc. The interceptor system can also obtain data from the communication link in addition to the physical layer data, such as (but not limited to) data related to communication link synchronization and/or operations, administration, and management ("OA&M") parameters of the radio frequency processing unit and the baseband processing unit. The interceptor may perform one or additional operations based on the additional data obtained from the communication link, such as (but not limited to) diagnostics of one or more components of a distributed base transceiver system, interfacing between a telecommunication system having a remote radio head architecture and other system architectures such as a distributed antenna system, emulating one or more devices in a telecommunication system having a remote radio head architecture, and the like.

Detailed descriptions of these aspects and examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 is a block diagram depicting an example interceptor system 102 that can analyze physical layer data communicated between a baseband processing unit 104 and a radio frequency processing unit 106 of a telecommunication system 100.

The baseband processing unit 104 and the radio frequency processing unit 106 provide a base transceiver system. Physical layer functions of the base transceiver system are logically and spatially distributed between the baseband processing unit 104 and the radio frequency processing unit 106. Distributing physical layer functions between the baseband processing unit 104 and the radio frequency processing unit 106 can provide improved power efficiency and coverage optimization as compared to systems in which physical layer functions are consolidated in a common base station.

The baseband processing unit 104 can communicate with a core network of the telecommunication system 100. The core network can include devices, groups of devices, or sub-systems in the telecommunication system 100 that can provide services to mobile devices or other terminal equipment. The baseband processing unit 104 can also communicate with the radio frequency processing unit 106 via a communication link 107. The communication link 107 can include any communication medium suitable for communicating data via digitized signals between the baseband processing unit 104 and the radio frequency processing unit 106. The digitized signals may be communicated electrically or optically. Non-limiting examples of a suitable communication medium for the communication link 107 can include copper wire (such as a coaxial cable), optical fiber, and microwave or optical communication link. The data communicated between the baseband processing unit 104 and the radio frequency processing unit 106 can include complex baseband samples grouped according to frequency channel and/or diversity antenna.

The communication link 107 the baseband processing unit 104 and the radio frequency processing unit 106 can communicate via a fixed assignment or packet-based architecture. The telecommunication system 100 including the baseband processing unit 104 and the radio frequency processing unit 106 may constitute any suitable network topology.

Although FIG. 1 depicts a single baseband processing unit 104 and a single radio frequency processing unit 106, other implementations are possible. In additional or alternative aspects, multiple baseband processing units can be included in a configuration of a telecommunication system. In additional or alternative aspects, multiple radio frequency processing units can be included in a configuration of a telecommunication system.

The signals communicated between the baseband processing unit 104 and the radio frequency processing unit 106 may be formatted according to any suitable digitized format, such as a baseband format or a digitized RF format. The data communicated between the baseband processing unit 104 and the radio frequency processing unit 106 can be formatted according to an interface standard for distributing physical layer functions. Non-limiting examples of an interface standard for distributing physical layer functions include CPRI, OBSAI, and ORI. The data communicated between the baseband processing unit 104 and the radio frequency processing unit 106 may be grouped according to frequency channel and diversity antenna. In some aspects, neither the hierarchy of logical or transport channels of a frequency channel or any multiple access scheme that may be supported within a frequency channel (e.g., time division multiple access ("TDMA") or code division multiple access ("CDMA")) may have affect the organization of the data on the communication link 107.

The radio frequency processing unit 106 can communicate with terminal equipment 108 via an air interface 109. The air interface 109 can include one or more radio-based communication links between the radio frequency processing unit 106 and the terminal equipment 108. The terminal equipment 108 can include electronic devices configured to communicate voice and/or data via a telecommunication system 100. Non-limiting examples of terminal equipment 108 include mobile stations, mobile devices, access terminals, subscriber stations, mobile terminals, remote stations, user terminals, subscriber units, cellular phones, smart phones, personal digital assistants ("PDAs"), laptop computers, netbooks, e-readers, wireless modems, etc.

The interceptor system 102 can include an interface device 110, such as a network access card or other physical layer device. The interface device 110 can retrieve or otherwise access physical layer data communicated between the baseband processing unit 104 and a baseband processing unit 104 via probes communicatively coupled to the uplink and downlink paths of the communication link 107. A non-limiting example of an interface device 110 is a digital transceiver.

In some aspects, an interface device 110 accessing a CPRI communication link 107 can include one or more electrical or optical connectors to which an electrical cable, optical cable, or other suitable cable can be connected. A non-limiting example of such a connector is an electrical or optical connector conforming to the Small Form Pluggable ("SFP") specification for bi-directional connectors. An SFP connector can be configured as an interface communication link for communicating a signal in the forward or downlink direction, the reverse or uplink direction, or both directions simultaneously. The connectors can include serial transceivers for receiving a serial signal from the communication link 107 or driving or other providing a serial signal into the communication link 107. The interface device 110 can perform one or more of the actions on a CPRI serial signal, including optical-to-electrical conversion, clock recovery and tracking, link symbol sampling, descrambling, 8B/10B decoding, serial-to-parallel conversion, and the like. The output of the interface device 110 can include frame-aligned digital data that can be written into the memory 112 and accessed by the processor(s) 110 and analysis engine 114. For a signal being transmitted via the communication link 107, the reverse sequence of the actions described above can be performed.

The interceptor system 102 can also include a processor 111 that can execute code stored on a computer-readable medium, such as a memory 112. The code can include an analysis engine 114 that can configure the processor 111 to characterize physical layer data received by the interface device 110. Examples of processor 111 include a microprocessor, an application-specific integrated circuit ("ASIC"), a field-programmable gate array ("FPGA"), or other suitable processor. The processor 111 may include one processor or any number of processors.

The interceptor system 102 can identify and extract the digital data belonging to the different frequency channels and antennas. In some aspects, the interceptor system 102 may delineate the data using air interface parameters such as (but not limited to) frame and slot markers.

Physical layer data communicated via an air interface 109 may lack one or more identifying characteristics, such as the RF frequency channel for communicating the physical layer data. The form of the signal on the communication link 107 can cause different RF frequency channels to have an identical appearance on the communication link 107. Digital signal parameters, such as (but not limited to) sample width and oversampling rate, may be unknown and/or inaccessible to the interceptor system 102. The interceptor system 102 can be configured to independently infer such identifying characteristics and/or digital signal parameters. For example, for a CPRI communication link 107 protocol, frequency and antenna groupings can be referred to as "Antenna Carrier Containers" ("AxCs"). A given AxC can be associated with a complex baseband signal at a certain frequency channel that is received at a particular antenna over a given time period. For Universal Mobile Telecommunications System ("UMTS") data communicated via a CPRI communication link 107, the time period can be the period of a UMTS chip. Each cell served in a telecommunication system compliant with the CPRI protocol can include AxCs on the forward and reverse CPRI communication links.

Figure 2:
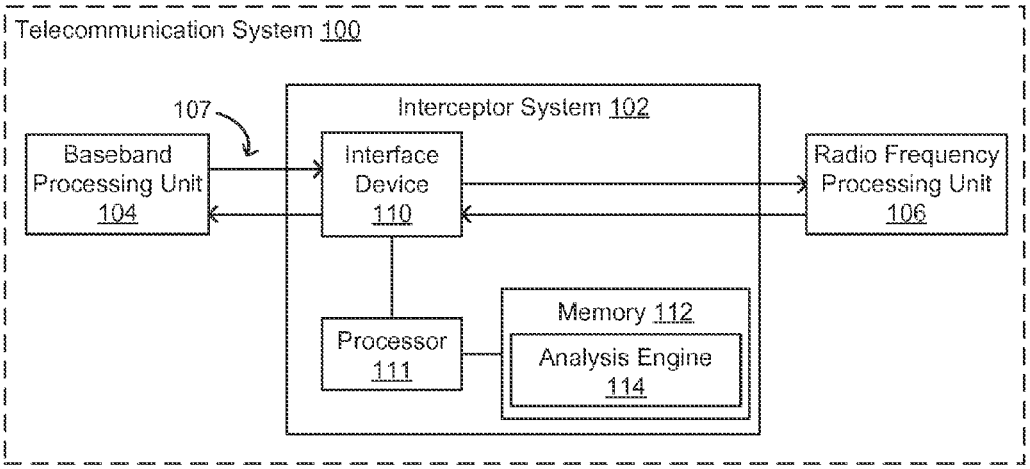
FIG. 2 is a block diagram of an interceptor system connected directly in line with a communication link between a baseband processing unit and a radio frequency processing unit according to one aspect.

Although FIG. 1 depicts passive coupling of an interceptor system 102 to the communication links between a baseband processing unit 104 and a radio frequency processing unit 106, other implementations are possible. For example, as depicted in FIG. 2, an interceptor system 102 can be coupled to the communication links such that the interceptor system 102 is directly in line with the communication link 107.

Figure 3:
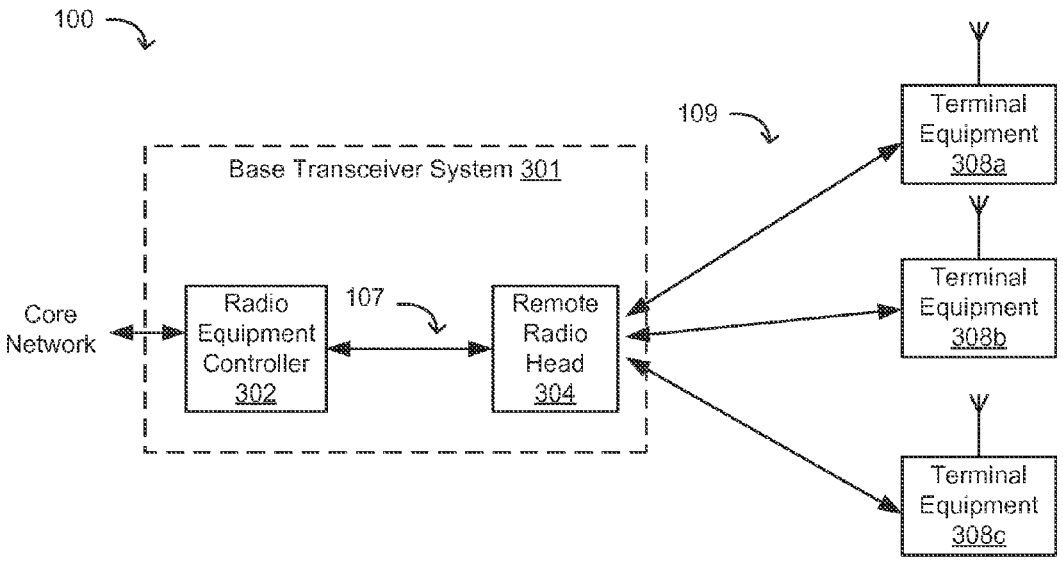
FIG. 3 is a block diagram of a telecommunication system including a radio equipment controller and a remote radio head with which an interceptor system may interface according to one aspect.

Non-limiting examples of a baseband processing unit 104 and a radio frequency processing unit 106 respectively include a REC and an RRH. FIG. 3 is a block diagram of a telecommunication system 100 including a REC 302 and an RRH 304 with which an interceptor system 102 may interface. The REC 302 and the RRH 304 provide a base transceiver system 301 for having physical layer functionality spatially distributed between the REC 302 and the RRH 304. The RRH 304 can communicate with terminal equipment 108a-c via the air interface 109. The interceptor system 102 can be connected between a REC 302 and a RRH 304 of a telecommunication system 100.

An interceptor system 102 may perform one or more discovery operations. For a given a communication link 107 via which physical layer data from one or more cells is communicated, discovery operations performed by the interceptor system 102 may include identifying some or all of the cells communicating via the communication link 107 and data associated with the cells. The interceptor system 102 can detect how physical layer data is organized on the communication link 107. The interceptor system 102 can sort the physical layer data into groupings. The interceptor system 102 can pair physical layer data representing uplink or downlink signals into diversity pairs. The interceptor system 102 can associate groupings, including uplink and downlink data, with a given cell.

The interceptor system 102 can identify the overall digital format of the data. The interceptor system 102 may not know the exact values of all parameters of the digital format of the data. For example, in a CPRI-compliant system, the interceptor system 102 may know that the communication link 107 is used for communicating complex baseband samples. The interceptor system 102 may not know the sample width, oversampling rate and placement of individual AxCs within each CPRI frame. The interceptor system 102 may know a range of possible values for signal characteristics (e.g., sample width, oversampling rate and placement of individual AxCs) for each CPRI frame.

An example process executed by an interceptor system 102 for performing discovery is described below. The process is described with respect to an example CPRI communication link 107 transferring UMTS data. However, other implementations involving other air standard for communicating via such an interface and/or other link transport protocols are possible. Additional details can be included based on the characteristics specific to other air standards and/or the communication transport protocols.

The interceptor system 102 can scan or otherwise search for forward beacons on each of the forward (i.e., downlink) communication links. Each air standard can include a forward beacon used by a mobile device or other terminal equipment to perform an initial cell search and selection process. Non-limiting examples of a forward beacon include the Frequency Correction Channel ("FCCH") and Synchronization Channel ("SCH") for Global System for Mobile Communications ("GSM") systems and Primary Synchronization Channel ("P-SCH"), Secondary Synchronization Channel ("S-SCH") and Common Pilot Channel ("C-PICH") for UMTS systems.

In some aspects, the interceptor system 102 can perform an exhaustive search on the forward links for link(s) using the set of possible parameters if the exact parameters of the digital format are not known to or accessible by the interceptor system 102. For example, in the case of a telecommunication system 100 compliant with the CPRI protocol, a downlink signal can be oversampled one or two times per chip and each downlink sample can include between 8 and 20 samples. The downlink samples are I/Q interleaved. The downlink samples start on an even bit within a CPRI basic frame structure. The start of a basic frame can be delineated with a known comma byte. The interceptor system 102 can extract or otherwise determine IQ signals from the bit stream based on the set of possible values. The interceptor system 102 can correlate extracted I/Q with a template for the UMTS P-SCH, S-SCH and CPICH. The interceptor system 102 can identify some or all of the downlink AxCs on the forward CPRI links of the communication link 107.

The interceptor system 102 can decode a system information broadcast channel for a detected downlink physical channel. An air standard can include broadcast channel used by a mobile device or other terminal equipment within a cell or coverage area to access the core network. The system information broadcast channel can be used to identify the cells or other coverage areas serviced by the core network. The system information broadcast channel can be a downlink physical channel that includes a logical or transport channel that broadcasts system information. For example, a system information broadcast channel for UMTS is the Broadcast Channel ("BCH"). Decoding the system information broadcast channel can confirm that a downlink physical channel has been successfully detected. Decoding of the system information broadcast channel can also provide the identity of a cell for which downlink data is bound. Decoding of the system information broadcast channel can also provide the random access parameters that the terminal equipment 108 may need to access the cell in the uplink direction.

Decoding the system information broadcast channel can allow the interceptor system 102 to characterize one or more downlink channels with a high degree of confidence. The interceptor system 102 can verify that data retrieved via the system information broadcast channel is correctly decoded by applying error correction codes.

The interceptor system 102 can also determine the uplink channels and group the uplink channels in diversity pairs. A given air standard can implement antenna diversity to improve the quality and reliability of a wireless link between a radio frequency processing unit 106 and terminal equipment 108. Antenna diversity can include using two or more antennas for recovering uplink signals transmitted by a given mobile device or other terminal equipment. For example, the recovery of uplink signals can be performed by a pair of identical antennas positioned adjacent to one another. The interceptor system 102 can group data containers representing diversity uplink signals corresponding to a given frequency channel into a diversity pair.

The interceptor system 102 can examine the spectral characteristics of a signal and compare the spectral characteristics to a spectral mask of the air standard. A given air standard can be associated with a given spectral mask having known or predictable spectral characteristics for the frequency spectrum used by the air standard.

The interceptor system 102 can group detected channels in diversity pairs by correlation. The interceptor system 102 can group diversity uplink signals by mathematically correlating the uplink signals to determine that the uplink signal waveforms are similar to one another.

The interceptor system 102 can associate uplink channels with downlink channels. For example, the interceptor system 102 can insert an uplink random access signal into each of the uplink channels in sequence. The interceptor system 102 can observe the downlink channels to identify which downlink channel is used to communicate a response to the uplink random access signal. The interceptor system 102 can also verify that the uplink channels has been properly detected by inserting an uplink random access signal and identifying which downlink channel is used to communicate a response. For example, in a telecommunication system for transmitting UMTS data via a CPRI communication link 107, the interceptor system 102 can insert a random access channel ("RACH") preamble signal into each of the detected uplink containers and monitor the downlink containers for a corresponding acquisition indication response. In some aspects, an uplink channel may be unloaded. The uplink containers may not be detectable using a spectral mask and/or correlation. A RACH preamble may be used for detecting uplink containers. The RACH preamble may also be used for cell association.

In additional or alternative aspects, the interceptor system 102 can associate uplink channels with downlink channels by staggering the configuration of cells or other coverage areas service by the telecommunication system. For example, each cell or coverage area may be deactivated and subsequently reactivated one by one. The interceptor system 102 can identify the association between uplink and downlink channels based on the additional data groupings detected on the communication link 107 as each cell or coverage area is brought back online.

In additional or alternative aspects, the interceptor system 102 can associate uplink channels with downlink channels based on the Operations, Administration, and Maintenance ("OA&M") parameters communicated via the uplink link and downlink link of a communication link 107. The OA&M parameters can include, for example, parameters configurable or configured by the core network of the telecommunication system 100 or an operator of a telecommunication service using the telecommunication system 100. The interceptor system 102 can access data to identify OA&M parameters for a given operator and identify the association between uplink and downlink channels based on the OA&M parameters.

In additional or alternative aspects, the interceptor system 102 can associate uplink channels with downlink channels using a transmitting device known by the interceptor system 102. The transmitting device can connect to a known cell within the telecommunication system 100. The transmitting device can transmit a test uplink signal to in the known cell. The interceptor system 102 can retrieve the test uplink signal as communicated between the radio frequency processing unit 106 and the baseband processing unit 104 via an uplink channel. The interceptor system 102 can associate the downlink channel carrying data for the known cell with an uplink channel by observing or otherwise determining where the uplink signal is received.

The process described above is a description of the discovery phase of the operation of the interceptor system 102. Additional details for example systems communicating UMTS data over CPRI links are described below with respect to FIGS. 12 and 13.

The interceptor system 102 can use the identification of the physical channels of the communication link 107 to perform one or more specific applications by accessing the physical layer data or other data obtained from the communication link 107, as discussed in detail below with respect to FIGS. 6-11. Performing one or more specific applications can include the interceptor system 102 extracting specific downlink or uplink channels and/or inserting data into specific uplink or downlink channels present on the communication link 107. For example, applications involving an analog RF interface with a conventional base station can be extended to the digital domain and performed using the data retrieved from the communication link 107.

Figure 4:
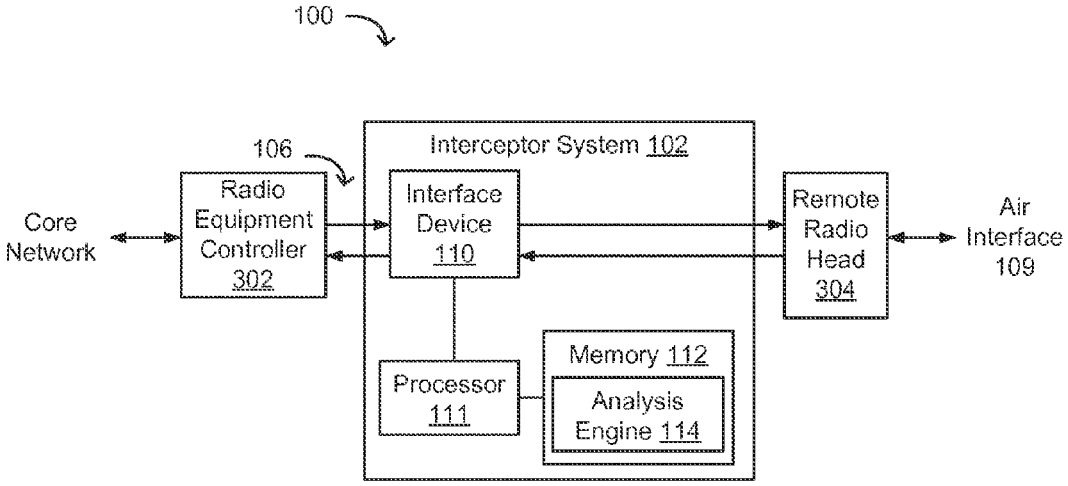
FIG. 4 is a block diagram of an interceptor system interfaced with a telecommunication system including a radio equipment controller and a remote radio head according to one aspect.

The normal operation phase of the interceptor system 102 can involve the interceptor system 102 interacting with the physical layer data communicated via a communication link 107 without affecting the normal operation of the two nodes at either end. As depicted in FIGS. 1,2, and 4, the interceptor system 102 can be included in a communication link 107 between the REC 302 or other baseband processing unit 104 and the RRH 304 or other radio frequency processing unit 106 without altering operations performed by either of the baseband processing unit 104 or the radio frequency processing unit 106. The interceptor system 102 can appear to nodes at either end of the communication link 107 as an additional link delay that may be detected during link delay calibration.

In additional or alternative aspects, the interceptor system 102 can periodically check that data organization for data communicated via the communication link 107 is unchanged. The interceptor system 102 can periodically check that the data organization is unchanged by demodulating the downlink channels and confirming that the cell identifier information is unchanged from the discovery phase.

Interface to a Distributed Antenna System

Figure 5:
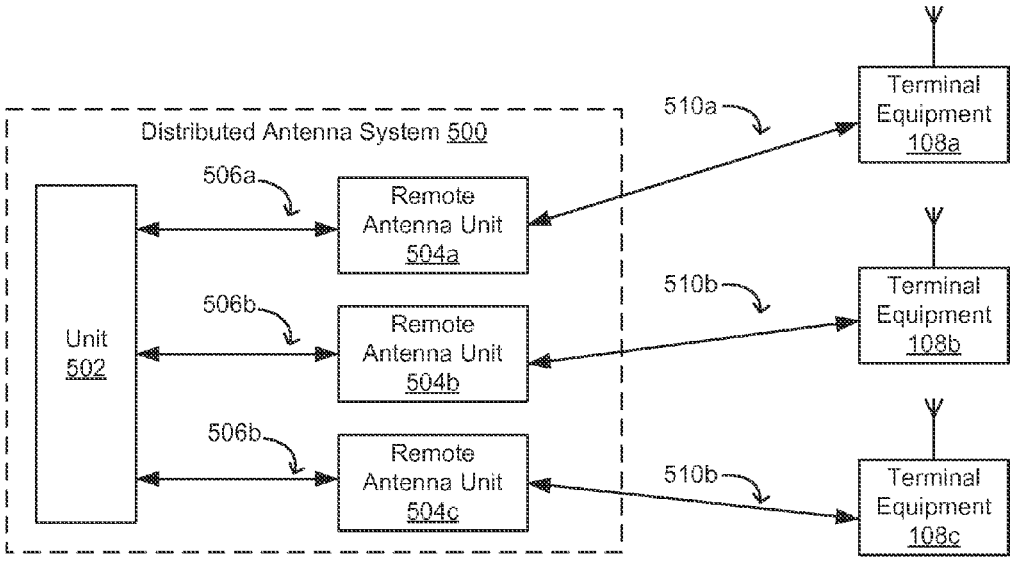
FIG. 5 is a block diagram of a distributed antenna system with which an interceptor system may interface according to one aspect.

One application of an interceptor system 102 in normal operation is interfacing with a distributed antenna system ("DAS"). A DAS is an example of a telecommunication system in which physical layer functions are distributed among different devices, such as a donor device communicatively coupled with one or more remote devices that are in communication with terminal equipment. For example, FIG. 5 is a block diagram depicting a DAS 500 including a unit 502 as a donor device and remote antenna units 504a-c.

The DAS 500 can communicate with one or more base stations via a wired or wireless communication medium. The unit 502 can communicate uplink and downlink signals between the base stations and one or more remote antenna units 504a-c distributed in the environment to provide coverage within a service area of the DAS 500. An example of a unit 502 include a master unit, such as (but not limited to) a digital conversion station. The unit 502 can convert downlink signals received from the base stations, such as RF signals, into one or more digital data streams for transmission to the remote antenna units 504a-c.

The unit 502 can provide downlink signals to the remote antenna units 504a-c via the links 506a-c. The links 506a-c can include any communication medium suitable for communicating data via digitized signals between the unit 502 and the remote antenna units 504a-c. The digitized signals may be communicated electrically or optically. Non-limiting examples of a suitable communication medium for the communication link 107 can include copper wire (such as a coaxial cable), optical fiber, and microwave or optical communication link.

The remote antenna units 504a-c can convert digital data streams to RF signals. The remote antenna units 504a-c can amplify the downlink signals and radiate the downlink signals to a number of terminal equipment 108a-c. Each of the remote antenna units 504a-c can communicate with terminal equipment 108a-c via air interfaces 510a-c. The air interfaces 510a-c can include radio-based communication links between the remote antenna units 504a-c and the terminal equipment 108a-c.

Figure 6:
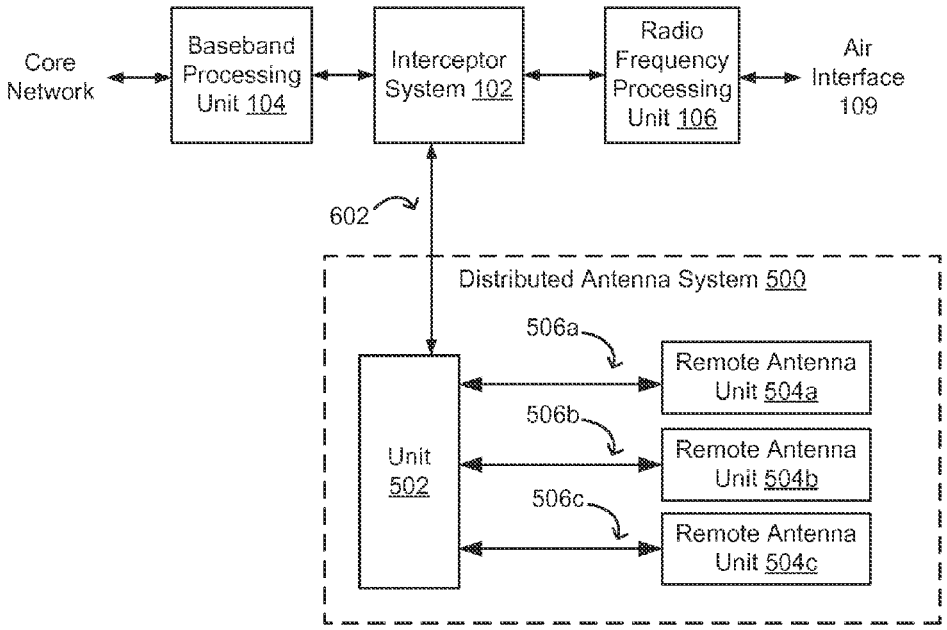
FIG. 6 is a block diagram of an interceptor system interfaced with a distributed antenna system, a baseband processing unit, and a radio frequency processing unit according to one aspect.

The interceptor system 102 can be used to interface components of a distributed base station system to a DAS 500, as depicted in FIG. 6. For example, a REC 302 can and an RRH 304 can be interfaced to the DAS 500 via the interceptor system 102. The DAS 500 can be co-located with or located remotely from a base station and can be in a location at which installing a donor antenna is not feasible. The interceptor system 102 can function as an interface to a DAS 500 in a manner that is transparent to the baseband processing unit 104 and the radio frequency processing unit 106.

The interceptor system 102 can communicate with a unit 502 of the DAS 500 via a link 602. The link 602 can include any suitable communication medium for communicating analog or digital signals between the interceptor system 102 and the unit 502. Non-limiting examples of a suitable communication medium for the link 602 can include copper wire (such as a coaxial cable), Ethernet cable, optical fiber, and microwave or optical communication link.

In a downlink (i.e., forward link) direction, the interceptor system 102 can extract some or all of the downlink data transmitted by the baseband processing unit 104. In some aspects, the extraction can be performed after the completion of the discovery phase. The interceptor system 102 can provide the extracted downlink data to the DAS 500. In some aspects, the interceptor system 102 can convert the extracted downlink data to a format compatible with the DAS 500. In an uplink (i.e., reverse) direction, the interceptor system 102 can receive uplink data from the DAS 500. The interceptor system 102 can provide the extracted uplink data to the reverse physical layer link.

Using the interceptor system 102 as an interface to a DAS 500 can allow a REC 302 or other baseband processing unit 104 to be used to drive a DAS 500 through a physical layer communication link 107 (e.g., CPRI) without the DAS 500 being configured for CPRI operation. For example, the interceptor system 102 can convert the downlink CPRI channels to an input format that is compatible with the unit 502 of the DAS 500. The unit 502 of the can control one or more remote antenna units 504a-c of the DAS 500. A reverse process can be performed in the uplink direction. The interceptor system 102 providing an interface with the DAS can allow the equipment connected to the interceptor system 102 to operate without departing from a normal operating mode.

Figure 7:
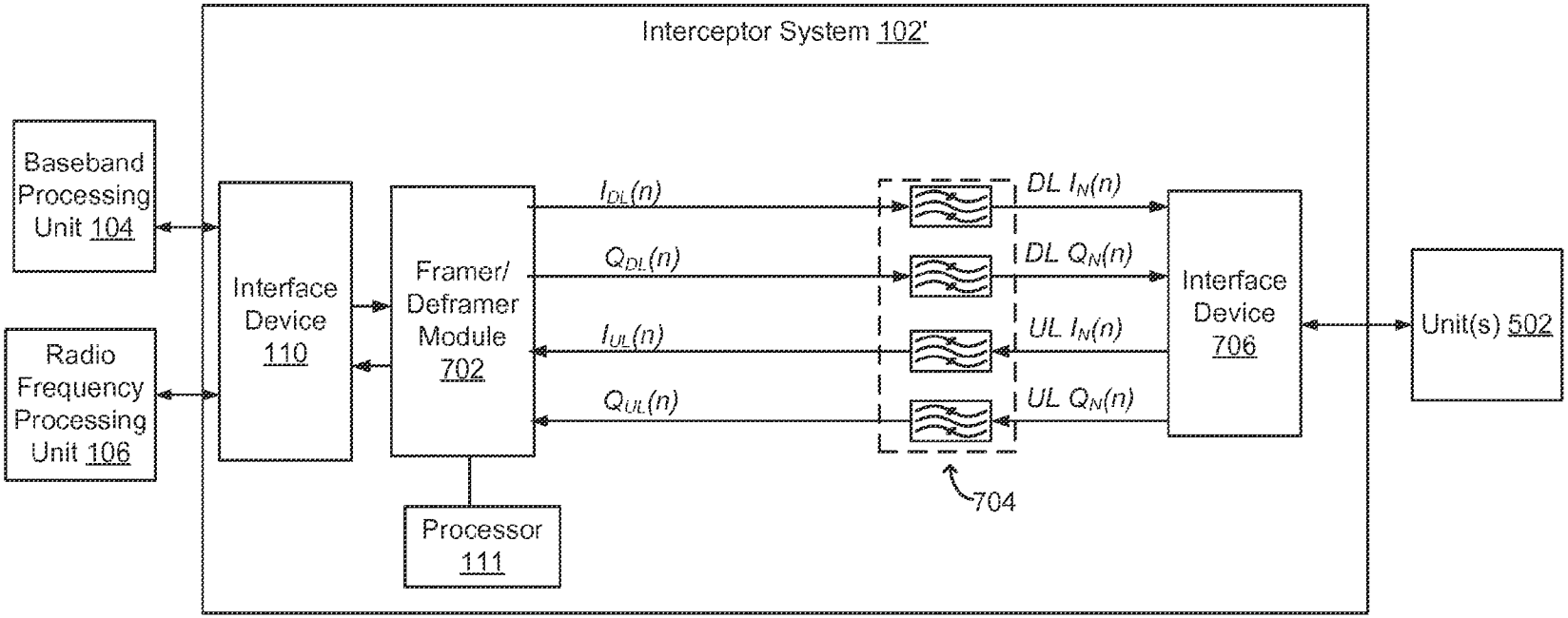
FIG. 7 is a block diagram of an interceptor system configured to provide an interface between a distributed antenna system, a baseband processing unit, and a radio frequency processing unit according to one aspect.

FIG. 7 is a block diagram of an example interceptor system 102' configured to provide an interface between a DAS 500, a baseband processing unit 104, and a radio frequency processing unit 106 according to one aspect.

The interceptor system 102' can convert digital signals in a standardized format into a format usable by a unit 502 of the DAS 500. Digital signals in a standardized format can include data packets formatted according to standardized communication protocols, such as (but not limited to) CPRI, OBSAI, or ORI. Digital signals in the standardized format can include data packets formatted according to a standard communication protocol. Each data packet can include one or more data frames. One data frame can include control data. Control data can include data for coordinating communication between baseband processing unit 104 and a device receiving digital signals in a standardized format. Another frame can include carrier data. Carrier data can include voice data and other information data to be transmitted by from the baseband processing unit 104 to terminal equipment 108a-c.

The interceptor system 102' can include one or more devices for transforming downlink digital signals in a standardized format into downlink complex digital signals. Devices for transforming downlink digital signals in a standardized format can include the interface device 110, the framer/de-framer module 702, filter bank 704, and processor 111.

A non-limiting example of a complex digital signal is a digital I/Q signal that includes complex digital samples. Complex digital samples include samples representing the in-phase ("I") component and quadrature ("Q") component of the sampled signal. Complex digital signals can also include digital signals using real samples rather than complex samples. A non-limiting example of such a complex digital signal is a digital I/Q signal with a quadrature component correlated with the in-phase component such that the sampled signal can be accurately represented using only real samples.

The interface device 110 can perform error correction on data received from baseband processing unit 104. Error correction can include detecting whether errors occurred during the transmission of the data packets. Non-limiting examples of errors may include failing to receive one or more data packets or receiving the data packets out of order. The interface device 110 can request that the baseband processing unit 104 re-send lost data packets. The interface device 110 can also re-order disordered data packets.

The interface device 110 can also synchronize communications between the interceptor system 102' and the baseband processing unit 104. The interface device 110 can provide downlink signals to framer/de-framer module 702. For example, the interface device 110 can recover a reference clock from signals received from the baseband processing unit 104. The recovered clock signal can be provided to components, such as one or more phase-locked loop ("PLL")/voltage controlled oscillator ("VCO") devices, that can use the recovered reference clock signal from the baseband processing unit 104 to output a system reference usable to frequency lock the DAS to the baseband processing unit 104. A transmit reference clock signal can also be generated by one or more of the PLL/VCO devices based on the recovered clock signal. The transmit reference clock signal can be used by the interface device 110 for transmitting data back to the baseband processing unit 104.

The framer/de-framer module 702 can de-frame the downlink digital signal in a standardized format. The downlink digital signal in the standardized format can include data packets in a frame structure specified by the standardized format. De-framing can include extracting control data and carrier data from the data packets. The framer/de-framer module 702 can provide the control data to processor 111. The framer/de-framer module 702 can provide the carrier data, which may include I/Q digital data $I_{DL}(n)$, $Q_{DL}(n)$, to a filter bank 704 as a downlink complex digital signal.

The control data can include control data extracted from the downlink digital signals in a standardized format. The processor 111 can use downlink control data from framer/de-framer module 702 to generate a corresponding uplink control data for uplink digital signals in a standardized format.

The filter bank 704 can include one or more downlink filters for passing specific frequency bands of the downlink complex digital signal. In some aspects, the filter bank 704 can output a band of frequencies or individual channels within one or more bands. For example, the downlink complex digital signal $I_{DL}(n)$, $Q_{DL}(n)$ may include a component signal at frequencies within the A and B frequency blocks of the cellular frequency band (i.e. 824-894 MHz). The filter bank 704 can include downlink filters configured to pass the frequencies within the A and B frequency blocks and reject any other component frequencies. The filter bank 704 can output a filtered downlink complex digital signal, depicted in FIG. 3 as I/Q signals, DL $I_N(n)$, DL $Q_N(n)$. The I/Q signals can be provided to one or more units 502 of the DAS 500 via an interface device 706.

In the uplink direction, the filter bank 704 can include uplink filters that can filter the I/Q uplink signal from a unit 502 of the DAS 500. Each uplink filter can pass an individual component of the I/Q uplink signal. Filtered I/Q uplink signals, depicted as $I_{UL}(n)$, $Q_{UL}(n)$, can be provided to the framer/de-framer module 702.

The framer/de-framer module 702 can use $I_{UL}(n)$, $Q_{UL}(n)$ to generate uplink digital signals in the standardized format. For example, the framer/de-framer module 702 can frame $I_{UL}(n)$, $Q_{UL}(n)$ into data packets with a frame structure specified by the standardized format. The data packets generated by the framer/de-framer module 702 can include uplink digital signals in the standardized format. In some aspects, each data packet includes a frame having control data and a frame having carrier data. Control data for the uplink digital signals in the standardized format can be provided by processor 111. Controller 208 can generate the control data using the control data extracted from the downlink digital signals in the standardized format.

Uplink signals from framer/de-framer module 702 can be transmitted to baseband processing unit 104 via the interface device 110. The interface device 110 can convert uplink signals to the proper format for transmission to baseband processing unit 104. For example, the interface device 110 can convert electrical signals received from framer/de-framer module 702 to optical signals for transmission over a fiber-optic cable.

Additional non-limiting examples for interfacing a physical layer communication link to a DAS based on the captured data are disclosed in U.S. patent application Ser. No. 13/493,060, titled "Distributed Antenna System Interface for Processing Digital Signals in a Standardized Format" by Kummetz et al.

Spectrum Analysis, Network Tuning and Network Optimization

The interceptor system 102 can select signal data from the communication link 107 for one or more frequency channels of interest. A spectral measurement can be performed at a base station site with a tower mounted remote RE. The spectral measurement can be performed without any personnel having to ascend the tower. For a network-enabled system, the personnel may not be required at the site. The interceptor system 102 can be remotely tasked with cell identifier information and can measure the signal seen from all terminal equipment or particular terminal equipment of interest. The measurement can also be performed at non-serving sites for a particular mobile device or other terminal equipment. Combined with drive testing, this can be an additional network optimization tool. Other possible applications include interference measurements and power measurements.

Base Station Diagnostics

Figure 8:
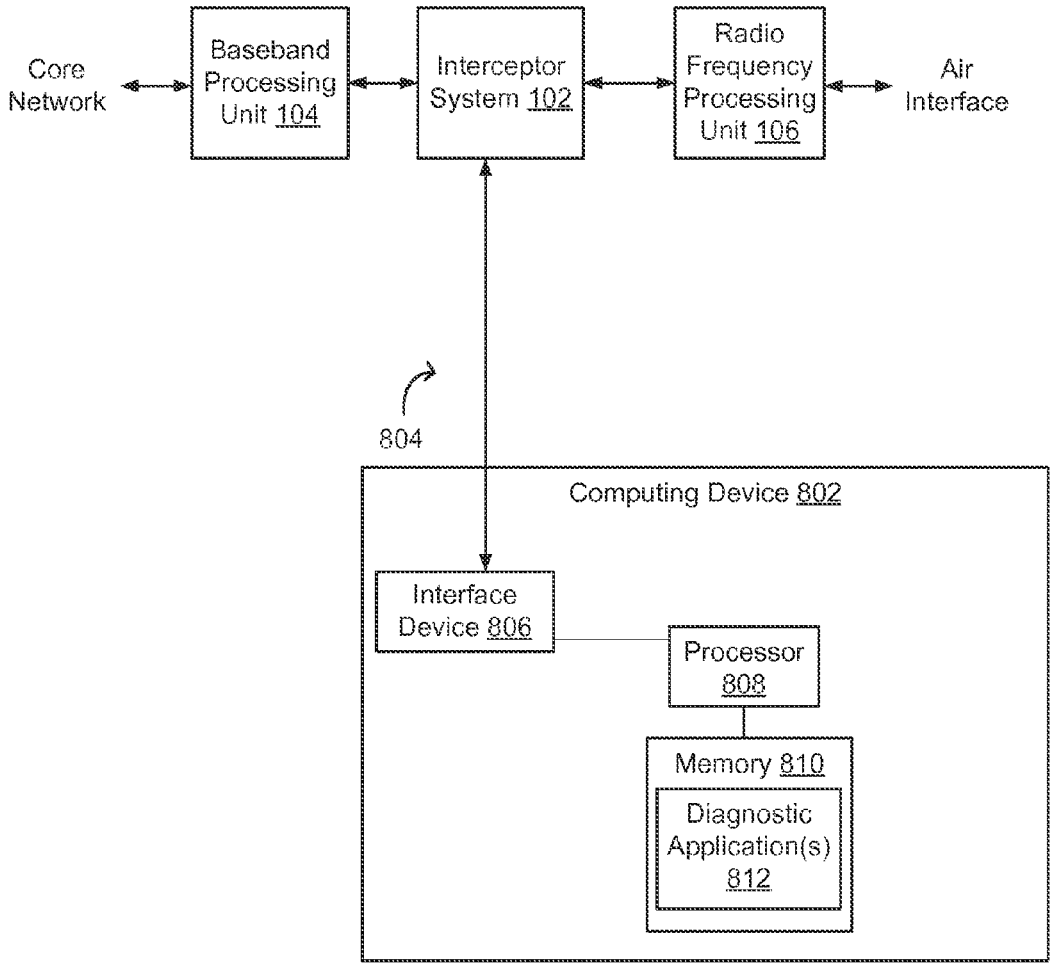
FIG. 8 is a block diagram of an interceptor system in communication with a computing device configured for performing base station diagnostics according to one aspect.

FIG. 8 is a block diagram depicting an interceptor system 102 in communication with a computing device 802 configured for performing base station diagnostics.

The computing device 802 can include an interface device 806, such as a network access card or other physical layer device, for communicating with the interceptor system 102 via link 804. The link 804 can include a data network link or other suitable communication path between the computing device 802 and the interceptor system 102. The computing device 802 can also include a processor 808 that can execute code stored on a computer-readable medium, such as a memory 810. The code can include one or more diagnostics applications 812 that can configure the processor 808 to perform base station diagnostics for the telecommunication system 100. Examples of processor 808 include a microprocessor, an ASIC, an FPGA, or other suitable processor. The processor 808 may include one processor or any number of processors.

Non-limiting examples of base station diagnostics can include passive intermodulation detection, voltage standing wave ratio ("VSWR") measurements, interference detection, and signal quality measurements. The interceptor system 102 can perform such measurements on the base station equipment without requiring personnel to be directly located at radio frequency processing unit 106, such as a RRH 304, or requiring disassembly of devices in the telecommunication system 100.

In additional or alternative aspects, the interceptor system 102 can inject test data into the telecommunication system 100 to perform diagnostics. In one example, a processor 111 of the interceptor system 102 can generate test data. In another example, the processor 808 of the computing device 802 can execute the diagnostics application(s) 812 to generate test data. The computing device 802 can transmit the test data to the interceptor system 102 via the link 804. The interceptor system 102 can transmit the test data to either a baseband processing unit 104 or a radio frequency processing unit 106 to perform diagnostics based on responses to the test data.

Geo-Location

Figure 9:
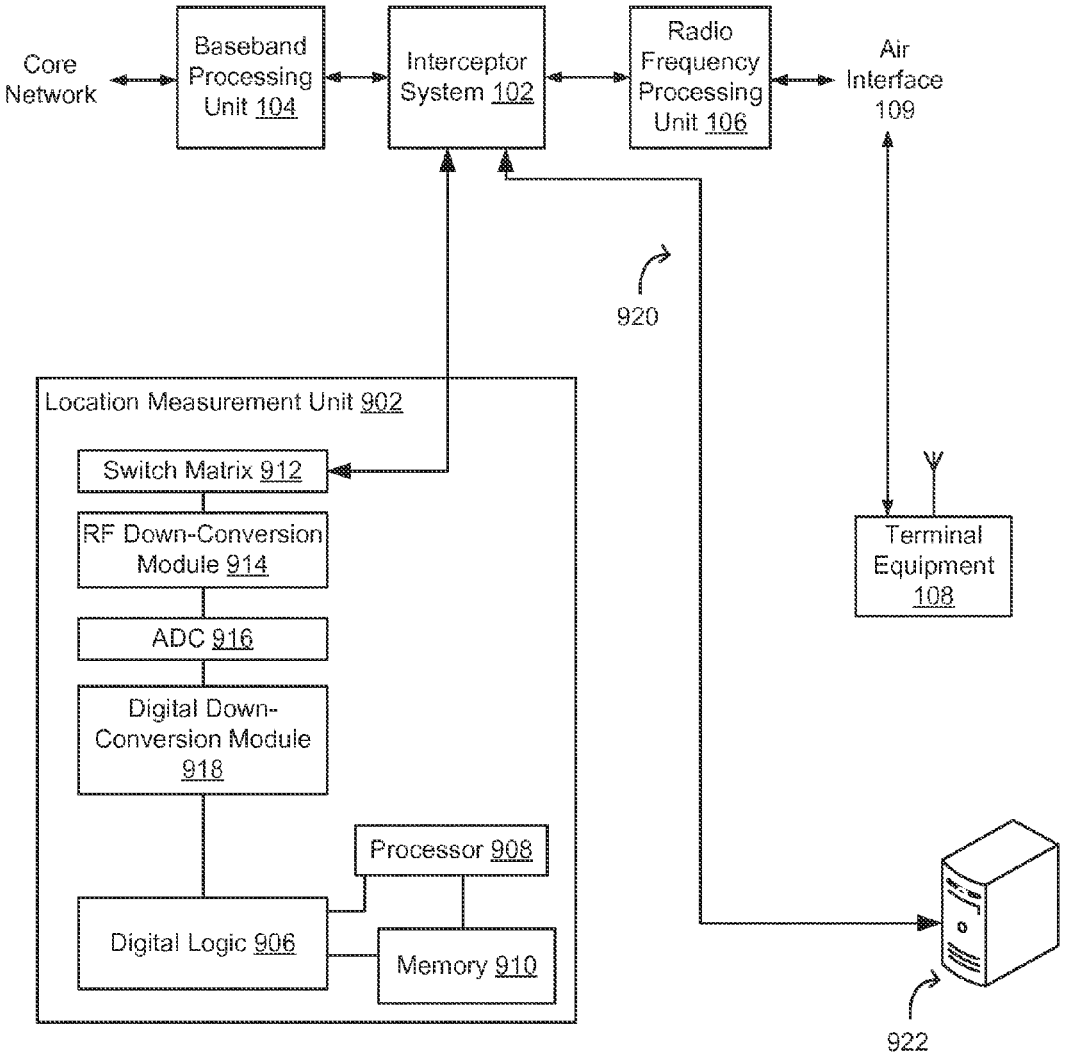
FIG. 9 is a block diagram of an interceptor system configured to perform one or more geo-location functions in a telecommunication system according to one aspect.

FIG. 9 is a block diagram depicting an interceptor system 102 configured to perform one or more geo-location functions in a telecommunication system 100.

One or more interceptor systems 102 can be connected at multiple sites to enable network overlay location technologies such as (but not limited to) Uplink Time Difference of Arrival ("UTDOA"). In a network with a high re-use factor, the uplink signal from terminal equipment 108 can be detected at neighboring sites. Each interceptor system 102 can have access to a highly accurate clock that allows multiple interceptor systems 102 to synchronize the capture of uplink data from communication links across multiple sites. In some aspects, the clock may be provided by a Location Measurement Unit ("LMU") 902 co-located with the interceptor system 102, as depicted in FIG. 9. For cases where the network broadcasts time information with sufficient accuracy on a downlink broadcast channel, the time information may be decoded and used as a timing reference at each of the processing sites.

In some aspects, interceptor system 102 can provide captured data to the LMU 902 for processing. The interceptor system 102 can convert the physical layer data into one or more analog RF signals. The interceptor system 102 can provide the analog RF signals to the LMU 902. The LMU 902 can process the captured data to obtain time-of-arrival ("TOA") information or angle-of-arrival ("AoA") information. The LMU 902 can provide the TOA information and/or AoA information to the interceptor system 102. In other aspects, the captured data can be processed by the interceptor system 102 to obtain the TOA or AoA information. The interceptor system 102 can provide the TOA or AoA information to a server 922 via a link 920. The server 922 can determine the location of terminal equipment 108 of interest.

In additional or alternative aspects, captured data from multiple sites can be provided to the server 922 via a link 920 for TOA determination. In additional or alternative aspects, a geo-location process can be implemented as part of a hybrid GPS/GNSS-terrestrial measurement solution.

In additional or alternative aspects, the LMU 902 can provide the TOA and/or the AOA to a server 922. In some aspects, the LMU 902 can communicate with the server 922 via a communication link separate from link 920. In additional or alternative aspects, the LMU 902 can communicate with the server 922 via a communication link and the link 920 can be omitted such that no direct communication link is provided between the interceptor system 902 and the server 922.

The LMU 902 can include an RF switch matrix 912 via which analog RF signals can be received. Analog RF signals can be down-converted by an RF down-conversion module 914. A non-limiting example of a RF down-conversion module 914 is a wideband block down-converter. The down-converted RF signals can be sampled by an analog-to-digital converter 916. The digital signals can be provided to a digital down-conversion module 918 to provide baseband complex I/Q signal samples. The I/Q samples can be processed by the 908 to achieve measurements relevant to location. Digital logic 906 and memory 910 may be optionally used for efficient processing of the I/Q data. The digital logic 906 may be implemented in, for example, an FPGA, application specific standard product ("ASSP"), an ASIC, and the like. Digital logic 906, processor 908, and memory 910 may be included in a computation module that is configured to compute, based on the I/Q data, signal measurements for location of a mobile station.

In additional or alternative aspects, the LMU 902 can digitally communicate with telecommunication devices, such as an interceptor system, via an optical-to-electrical interface. An optical-to-electrical interface can convert optical data to electrical digital data. The electrical digital data can include I/Q data. The I/Q data can be provided to the digital logic 906 to extract the I/Q data for signal processing. The I/Q data may vary by sample rate or the number of bits sampled. The I/Q data can be a complex representation of an RF signal. The I/Q signal data may be packaged in an optical data stream into a container. The LMU 902 can extract the container(s) of interest for signal processing based on the relevance to location. In some aspects, the programmable logic 906 and/or the processor 908 may perform this container extraction.

The LMU 902 can compute time, phase, and/or power measurements using I/Q data via techniques such as time difference of arrival, angle of arrival, multiple range estimation location ("MREL"), total flight time ratio pattern matching ("TFTRPM"), and the like. In additional or alternative aspects, the LMU 902 may operate in a proximity detector mode, identifying which of multiple RRHs 302 is hosting a target mobile call from terminal equipment 108. Measurements from the LMU 902 may be used by the GCS for cooperative location.

Non-limiting examples for performing geo -location based on the captured data are disclosed in U.S. patent application Ser. No. 13/443,142, titled "Mobile Location in a Remote Radio Head Environment" by Beck et al.

Inter-Operability Between Incompatible Equipment

In additional or alternative aspects, the interceptor system 102 can be deployed as an inter-operability bridge between incompatible equipment, such as a REC 302 that is incompatible with a RRH 304 or other radio equipment. For example, a REC 302 may be operated by a vendor or other operator that is different from a vendor or other operator using an RRH 304 or other radio equipment. Data may be inserted, deleted, or modified by the interceptor system 102 to maintain compatibility between the otherwise incompatible REC 302 and RRH 304 or other radio equipment. The interceptor system 102 can provide any translations or other conversion of data between the otherwise incompatible REC 302 and RRH 304. Communication via the interceptor system 102 between the otherwise incompatible REC 302 and RRH 304 equipment can be transparent to either of the REC 302 and the RRH 304.

Device Emulation

Figure 10:
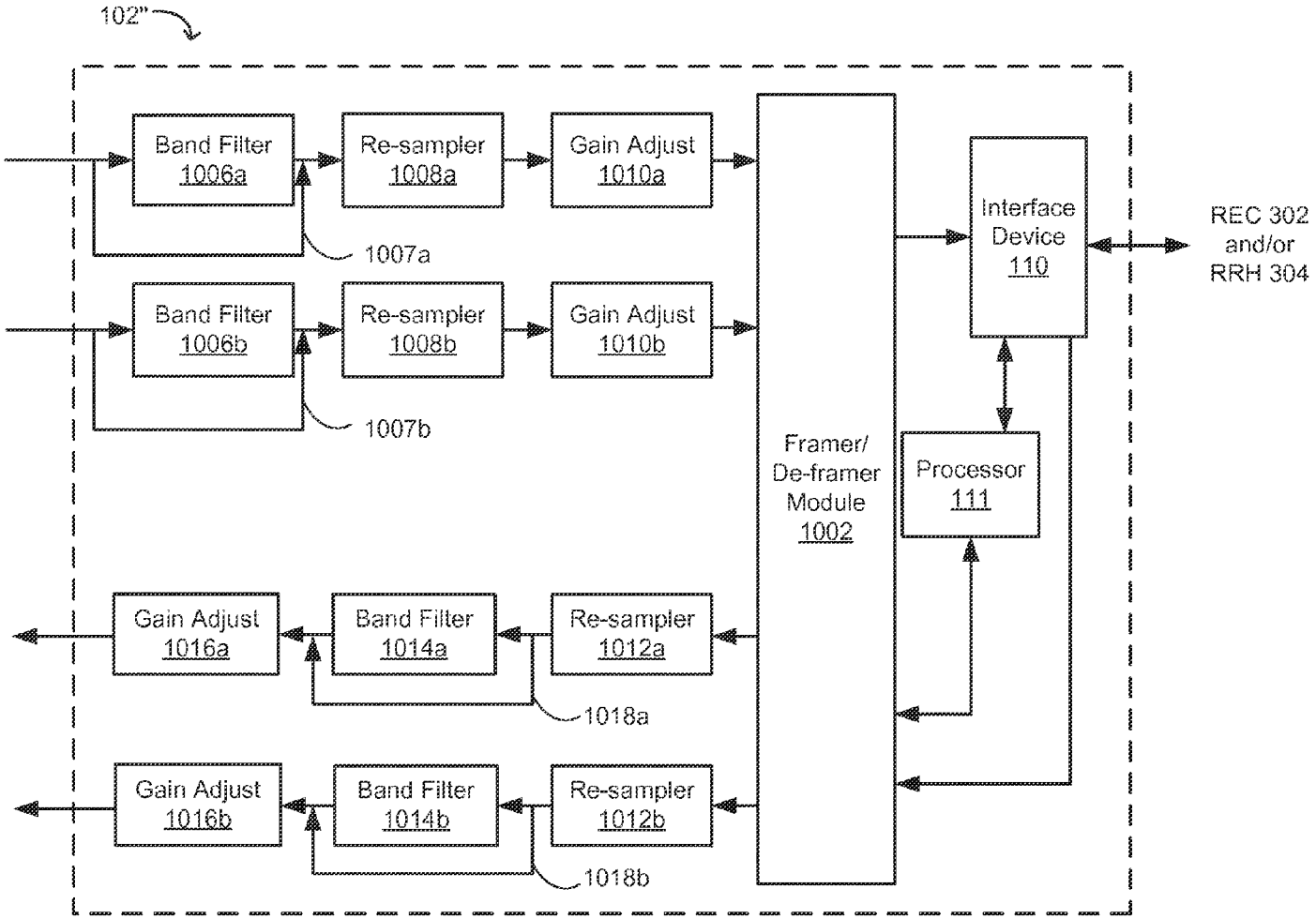
FIG. 10 is a block diagram of an interceptor system that is configured to emulate a source of digital signals in a standardized format according to one aspect.

In additional or alternative aspects, the interceptor system can emulate one or more devices, such as a source and/or recipient of digital signals in a standardized format. For example, an interceptor system 102 may provide device emulation by providing translation for incompatible OA&M messaging layers, converting I/Q data from a first format supported by one device to a second format supported by another device, etc. FIG. 10 is a block diagram of an example interceptor system 102" that can emulate a source and/or recipient of digital signals in a standardized format. Digital signals in a standardized format can include data packets formatted according to standardized communication protocols, such as (but not limited to) CPRI, OBSAI, or ORI. Digital signals in the standardized format can include data packets formatted according to a standard communication protocol. Each data packet can include one or more data frames. The interceptor system 102" can receive signals in a non-standardized format, such as from a DAS 500 or other system. Non-limiting examples of signals in the non-standardized format can include analog signals and non-standard digital signals. The interceptor system 102" can generate signals in the standardized format, including control information required by the standardized format. For example, the interceptor system 102" may format data to be transmitted to the REC 302 based on OA&M parameters of the REC 302. The signals in the standardized format can be provided to the REC 302. The interceptor system 102' can transmit the emulated data to the REC 302 in a transparent manner without the REC 302 modifying any functions normally used to communicate with radio equipment.

The interceptor system 102" can emulate a source and/or recipient of digital signals in a standardized format using component including the processor 111, a framer/de-framer module 1002, and the interface device 110.

The interceptor system 102 can emulate a source of digital signals in a standardized format using components in a transmission path and/or emulate a recipient of digital signals in a standardized format using components in a reception path. A transmission path can include one or more devices for emulating digital signals in a standardized format for transmission to a device using a standardized telecommunication protocol such as CPRI, ORI, or OBSAI. One example of an emulated transmission signal is an emulated uplink signal communicated to a REC 302 or baseband processing unit 106. Another example of an emulated transmission signal is an emulated downlink signal communicated to a RRH 304 or another radio frequency processing unit 106. In the transmission path, the interceptor system 102" includes band filters 1006a, 1006b, re-samplers 1008a, 1008b, and gain adjust devices 1010a, 1010b. A reception path can include one or more devices for processing received digital signals in a standardized format for transmission to a target devices using a different standardized telecommunication protocol, target devices communicating non-standardized digital data, or target devices communicating analog signals. The reception path can include uplink digital signals in a standardized format received from a RRH 304 or another radio frequency processing unit 106 and/or downlink digital signals in a standardized format received from a REC 302 or another baseband processing unit 104.

The framer/de-framer module 1002 can perform the same data-extraction and data-combining functions as the framer/de-framer module 702 depicted in FIG. 7. In the transmission direction, the framer/de-framer module 1002 can convert complex digital signals into digital signals in a standardized format for transmission. Control data can be provided by the processor 111. Carrier data can be generated from the complex digital signals to be transmitted.

The interceptor system 102" can receive and transmit digital signals in a standardized format via the interface device 110. In a transmission path, the framer/de-framer module 1002 can provide transmitted signals in a standardized format via the interface device 110. In a reception path, the framer/de-framer module 1002 can de-frame received digital signals in a standardized format.

Framer/de-framer module 1002 can provide control data extracted from a received digital signal to the processor 111. Framer/de-framer module 1002 can also convert carrier data extracted from received digital signals in a standardized format into a complex digital signal. In some aspects, the processor 111 can use the control data extracted from the received digital signals in a standardized format to generate the control data added to the transmitted signals digital signals in the standardized format.

The band filters 1006a, 1006b can filter the complex digital signals to be transmitted according to configured filtering characteristics. Each band filter 1006a, 1006b can pass individual component signals of the complex digital signals to be transmitted at frequencies within a given frequency band. Each band filter 1006a, 1006b can pass individual complex digital signals to be transmitted and reject or attenuate other complex digital signals. The band filters 1006a, 1006b can provide filtered digital signals, each representing an individual complex digital signal to be transmitted, to the re-samplers 1008a, 1008b. The band filters 1006a, 1006b may also include filter bypasses 1007a, 1007b. Each of the filter bypasses 1007a, 1007b can be selectively operated to pass the entire complex digital signal, if desired.

The re-samplers 1008a, 1008b can re-sample the filtered digital signals to a sampling rate suitable for processing by the framer/de-framer module 1002 and acceptable to the device receiving digital signals in a standardized format. The new sampling rate can be specified by the standardized format used by the receiving device, such as a REC 302 or a RRH 304. The re-samplers 1008a, 1008b can provide re-sampled baseband digital signals to gain adjust devices 1010a, 1010b.

The gain adjust devices 1010a, 1010b can apply a gain function to the complex digital signals to be transmitted. The gain function can adjust the power of the complex digital signals to be transmitted to the power specified by the standardized format used by the receiving device. In some aspects, the gain function may be a frequency dependent gain and/or a phase of group delay based on processing functions that is applied to the digital samples. Gain adjust devices 1010a, 1010b can provide the complex digital signals to be transmitted to framer/de-framer module 1002.

In a reception path, re-samplers 1012a, 1012b can receive a complex digital signal from the framer/de-framer module 1002. Re-samplers 1012a, 1012b can re-sample the complex digital signal to a sampling rate optimized for use by a device to which the complex digital signal is to be provided. Re-samplers 1012a, 1012b can provide the complex digital signal to band filters 1014a, 1014b.

Band filters 1014a, 1014b can filter the complex digital signals according to configured filtering characteristics. Each received complex digital signal may include one or more component complex digital signals. Each band filter 1014a, 1014b can pass a specific frequency band corresponding to an individual component complex digital signal. The band filters 1014a, 1014b can provide the filtered complex digital signals to gain adjust devices 1016a, 1016b. The band filters 1014a, 1014b may also include the filter bypasses 1018a, 1018b, which can be selectively operated to pass the entire received complex digital signal, if desired.

The gain adjust devices 1016a, 1016b can apply a gain function to the complex digital signals. The gain adjust devices 1016a, 1016b can adjust the power level of complex digital signals to a power level suitable for processing by the device receiving the signal, in accordance with configured characteristics of the gain adjust devices 1016a, 1016b.

Legacy Base Station Support

In additional or alternative aspects, the interceptor system 102 can provide an interface between radio equipment of a distributed base station system and a legacy base station in a telecommunication system. For example, a remote radio head architecture may be deployed to support a new air standard technology in a coverage area in which a legacy air standard technology is also used.

Figure 11:
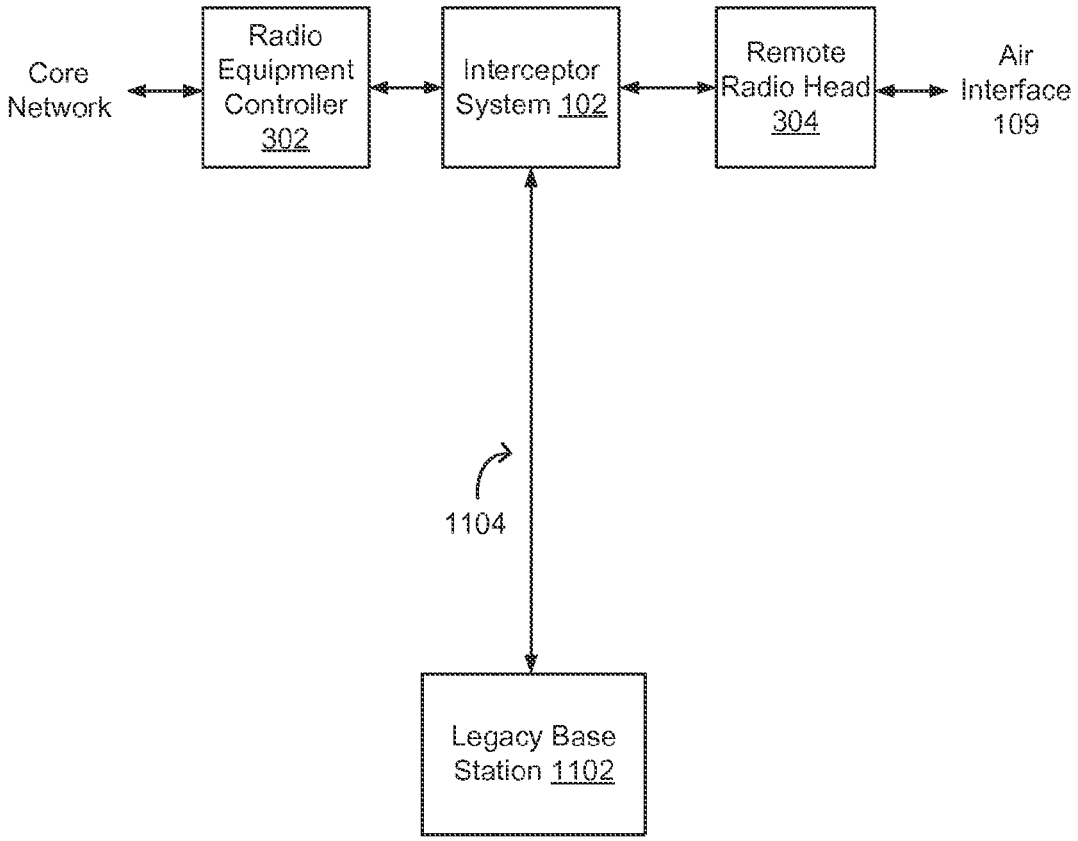
FIG. 11 is a block diagram of an interceptor system providing an interface between a remote radio head and a legacy base station according to one aspect.

FIG. 11 is a block diagram depicting an interceptor system 102 providing an interface between a RRH 304 and a legacy base station 1102. The interceptor system 102 can communicate with the legacy base station via an analog communication link 1104. Using the interceptor system 102 as an interface between the RRH 304 can obviate the need for a separate antenna system for communicating with the legacy base station 1102.

A legacy base station 1102 can include a base station using analog RF inputs and outputs. The interceptor system 102 can be communicatively coupled to the legacy base station. The interceptor system 102 can retrieve digital RF data transmitted by RRH 304 equipment. The interceptor system 102 can convert the digital RF data into analog RF data. The interceptor system 102 can provide the converted analog RF data to the legacy base station 1102 via the link 1104.

The interceptor system 102 can receive analog digital RF data transmitted by the legacy base station 1102 via the link 1104. The interceptor system 102 can convert the analog RF data into digital RF data. The interceptor system 102 can provide the converted digital RF data to the RRH 304.

CPRI Discovery

Additional details are provided below for container discovery algorithms using the case of UMTS over CPRI. CPRI is a full-duplex high-speed serial communication link protocol for carrying physical layer data between a RE and REC 302. CPRI supports a fixed number of rates, all of which are integer multiples of 614.4 Mbps. The data is communicated using a frame structure. The fundamental unit of the structure is the CPRI basic frame.

A CPRI basic frame can used for a line rate of 614.4 Mbps. Each frame can be divided into 16 words of equal size. Word 0 can be reserved for control messages and words 1-15 carry user plane ("IQ") data. Each frame can be encoded using a 8B/10B line protocol. The 8B/10B encoding is used for data randomization and error detection. One basic frame is transmitted per UMTS chip period at all rates. As the line rate increases, the frame size scales accordingly to accommodate this requirement.

A CPRI basic frame can used for a line rate of 3072 Mbps. Within the user data, each container is specified by a start bit and bit length. The bit length of the container is a function of sample width and oversampling of the signal.

The CPRI basic frame is part of a larger frame hierarchy that is analogous to the UMTS frame structure. 256 CPRI basic frames are included in a CPRI hyperframe. 150 hyperframes are included in a nodeB frame or 10-millisecond frame. A CPRI hyperframe is analogous to one spread UMTS symbol having a spreading factor of 256. A 10-millisecond frame is equivalent to the UMTS nodeB Frame. The CPRI nodeB frames are arranged in a repeating structure of frames having a length of 4096 frames. This is analogous to the UMTS System Frame Number. CPRI specifies that the CPRI frame timing is synchronous with the UMTS frame timing at the source/destination antenna adjusted for the appropriate delays. This relationship allows the interceptor system to determine the UMTS 10 millisecond frame boundary from observing the CPRI basic frame and hyperframe number. The first control byte in basic frame 0 of each hyperframe is a special comma byte. In its encoded form, the first control byte is used to synchronize the 10B/8B deserializer at start-up. After decoding/deserializing, it indicates the start of basic frame 0 of a hyperframe. Other control words within the hyperframe contain the hyperframe number ("HFN") and System Frame Number ("SFN"). This ability to delineate the data simplifies the process of UMTS container discovery.

In the downlink direction, the performance of one or more discovery operations by the interceptor system 102 may be dependent on whether the interceptor system 102 can access the primary scrambling codes of the cells on the communication link 107.

For cases in which the interceptor system 102 can access scrambling code information, the interceptor system 102 can initiate downlink container discovery on a forward CPRI communication link by capturing the entire block of user plane data for a small number of basic frames ("256 or less") starting from a basic frame 0 of hyperframe 0 of an arbitrary CPRI 10 millisecond frame. The interceptor system 102 can capture the entire block by synchronizing its timing to the CPRI hyperframe structure using the comma byte. The interceptor system 102 can decode the hyperframe number as described in the above. The interceptor system 102 can search the blocks of user data for each of the provisioned scrambling codes. The extent of the search depends on the extent to which the containers are defined. If the containers are fully specified, the search can be minimal and involve searching the defined containers for the provisioned scrambling codes. If the containers are unspecified, the search involves performing multiple permutations of the container parameters. The number of frames captured can be small for data that is free of noise or channel impairments.

For cases in which the scrambling codes are unknown to or inaccessible by the interceptor system 102, the interceptor system 102 can capture a larger block of user data than the 256 basic frames described above. The interceptor system 102 can capture the first 256 basic frames of each 2560 basic frames for a full 10-millisecond slot. The capture can be aligned to the start of an arbitrary 10-millisecond CPRI frame.

The interceptor system 102 can decipher the secondary synchronization codes for each cell. The scope of the search can depend on the extent to which the containers are defined. SSC detection leads to primary scrambling code detection.

The interceptor system 102 can map decoded downlink containers to the cells by decoding cell identifier information from the BCH transport channel. Link direction may not be known to initiate downlink container discovery. If initiated on a reverse communication link 107, downlink container discovery may fail.

Other conditions can be considered to accelerate the discovery process. If the default bits for inactive containers are known, the algorithm can be executed more efficiently.

In the uplink direction, uplink container discovery can involve the identification of the uplink containers and their association with the downlink containers. The containers can be identified by measuring the spectral characteristics of the signal and comparing the spectral characteristics of the signal to the spectral mask for the signal. The uplink containers can be paired as diversity pairs by using correlation. The uplink containers can be associated with downlink cells by inserting the UMTS RACH preamble into each containers and observing the downlink container that carries the response.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

The invention claimed is:

1. An interceptor system comprising:

an interface device configured to retrieve data from at least one communication link between a radio frequency processing unit and a baseband processing unit of a telecommunication system, wherein the data includes digital data communicated between the radio frequency processing unit and the baseband processing unit; and a processing device configured to determine an interface link protocol for communicating with terminal equipment via the telecommunication system, *wherein the digital data comprises physical layer data, wherein the at least one communication link comprises at least one downlink channel and at least one uplink channel, wherein the interface link protocol comprises a manner in which the physical layer data is transferred among co-located or distributed nodes situated on the same side of an air interface of a telecommunications system, wherein at least one parameter of the interface link protocol is unknown and inaccessible directly from the digital data, the determination* based on identifying an organization of the data retrieved from the at least one communication link, wherein the organization of the data comprises a manner in which the data is sequenced in a data stream.

2. The interceptor system of claim 1, wherein the interface device is configured to be communicatively coupled to the at least one communication link, wherein the baseband processing unit comprises a radio equipment controller and the radio frequency processing unit comprises a remote radio head.

3. The interceptor system of claim 1, wherein the at least one communication link is established via at least one of a fiber optic cable or an electrical cable.

4. The interceptor system of claim 1, [wherein the digital data comprises physical layer data, wherein the at least one communication link comprises at least one downlink channel and at least one uplink channel and] wherein the processing device is configured to analyze the organization of the physical layer data by:

identifying the at least one downlink channel by detecting at least one forward beacon in the physical layer data, the at least one forward beacon associated with the at least one downlink channel; and determining that downlink physical layer data communicated via the at least one downlink channel is associated with uplink physical layer data communicated via the at least one uplink channel.

5. The interceptor system of claim 4, wherein the processing device is configured to identify the at least one downlink channel by performing operations comprising:

decoding a system information broadcast channel associated with the at least one downlink channel; and identifying a cell associated with the at least one downlink channel based on decoding the system information broadcast channel.

6. The interceptor system of claim 4, wherein the processing device is configured to identify the at least one downlink channel by identifying at least one frame and at least one slot marker of the downlink physical layer data.

7. The interceptor system of claim 4, wherein the processing device is configured to identify the at least one downlink channel by identifying a sample width and a sample rate of the downlink physical layer data.

8. The interceptor system of claim 4, wherein the processing device is further configured to analyze the organization of the physical layer data by identifying the at least one uplink channel.

9. The interceptor system of claim 8, wherein the processing device is configured to identify the at least one uplink channel by performing operations comprising:

retrieving a first uplink signal and a second uplink signal;

determining that the first uplink signal and the second uplink signal are similar based on cross-correlating the first uplink signal and the second uplink signal; and grouping the first uplink signal and the second uplink signal in a diversity pair based on determining that the first uplink signal and the second uplink signal are similar.

10. The interceptor system of claim 4, wherein the processing device is configured to determine that the downlink physical layer data is associated with the uplink physical layer data by performing operations comprising:

transmitting test physical layer data to the baseband processing unit via the interface device, wherein the test physical layer data is transmitted via the at least one uplink channel, and detecting that the downlink physical layer data from the baseband processing unit is received via the at least one downlink channel in response to transmitting the test physical layer data.

11. The interceptor system of claim 10, wherein the processing device is configured to add the test physical layer data to the uplink physical layer data.

12. The interceptor system of claim 10, wherein transmitting the test physical layer data to the baseband processing unit via the interface device comprises transmitting an uplink random access preamble message via a carrier signal of the at least one uplink channel.

13. The interceptor system of claim 4, wherein the interceptor system is communicatively coupled to a unit of a distributed antenna system, wherein the processing device is further configured to:

extract additional physical layer data communicated between the baseband processing unit and the distributed antenna system via the at least one downlink channel or the at least one downlink channel;

convert the extracted physical layer data to a first data format compatible for transmission to the distributed antenna system or a second format compatible for transmission to the baseband processing unit; and communicate the converted physical layer data to the unit of the distributed antenna system or the baseband processing unit.

14. The interceptor system of claim 4, wherein the interceptor system is communicatively coupled to an analog base station, wherein the processing device is further configured to:

extract additional physical layer data communicated between the analog base station and at least one of the baseband processing unit and the radio frequency processing unit;

convert the extracted physical layer data to an analog format compatible for transmission to the analog base station or a data format compatible for transmission to the at least one of the baseband processing unit and the radio frequency processing unit; and communicate the converted physical layer data to the analog base station or the at least one of the baseband processing unit and the radio frequency processing unit.

15. The interceptor system of claim 1, wherein the processing device is further configured to:

determine that the baseband processing unit is configured to communicate via a first data format incompatible with a second data format used by the radio frequency processing unit;

convert the data between the first data format and the second data format; and communicate the converted data between the baseband processing unit and the radio frequency processing unit.

16. The interceptor system of claim 1, wherein the processing device is further configured to perform diagnostics on physical layer data communicated between the baseband processing unit and the radio frequency processing unit.

17. The interceptor system of claim 16, wherein the processing device is further configured to transmit test physical layer data to the baseband processing unit or the radio frequency processing unit, wherein the test physical layer data is formatted based on physical layer data communicated between the baseband processing unit and the radio frequency processing unit, wherein the diagnostics are performed based on a response from the baseband processing unit or the radio frequency processing unit.

18. The interceptor system of claim 1, wherein the processing device is further configured to perform geo-location of the terminal equipment.

19. The interceptor system of claim 1, wherein the processing device is further configured for:

emulating a source of digital signals in a standardized format, wherein the digital signals in the standardized format comprise data packets formatted according to a standardized communication protocol; and communicating the digital signals in the standardized format to a device configured to receive digital signals in the standardized format.

20. The interceptor system of claim 19, wherein the device configured to receive digital signals in the standardized format comprises at least one of the baseband processing unit or the radio frequency processing unit.

21. The interceptor system of claim 1, wherein the processing device is configured for identifying the organization of the data by analyzing the organization of the data.

22. The interceptor system of claim 1, wherein the processing device is configured for identifying the organization of the data based on additional data communicated from an external data source.

23. A method comprising:

retrieving digital data from at least one communication link between a radio frequency processing unit and a baseband processing unit of a telecommunication system; and

*independently* determining an interface link protocol for communicating with terminal equipment via the telecommunication system, *wherein the digital data comprises physical layer data, wherein the at least one communication link comprises at least one downlink channel and at least one uplink channel, wherein the interface link protocol comprises a manner in which the physical layer data is transferred among co-located or distributed nodes situated on the same side of an air interface of a telecommunication system, wherein at least one parameter of the interface link protocol is unknown and inaccessible directly from the digital data, the determination* based on analyzing an organization of the digital data retrieved from the at least one communication link, wherein the organization of the digital data comprises a manner in which the digital data is sequenced in a data stream.

24. The method of claim 23, [wherein the at least one communication link comprises at least one downlink channel and at least one uplink channel and] wherein analyzing the organization of the physical layer data comprises:

identifying the at least one downlink channel by detecting at least one forward beacon in the physical layer data, the at least one forward beacon associated with the at the at least one downlink channel; and determining that downlink physical layer data communicated via the at least one downlink channel is associated with uplink physical layer data communicated via the at least one uplink channel.

25. The method of claim 24, wherein identifying the at least one downlink channel further comprises:

decoding a system information broadcast channel associated with the at least one downlink channel; and identifying a cell associated with the at least one downlink channel based on decoding the system information broadcast channel.

26. The method of claim 25, wherein identifying the at least one downlink channel comprises identifying at least one frame and at least one slot marker of the downlink physical layer data.

27. The method of claim 25, wherein identifying the at least one downlink channel comprises identifying a sample width and a sample rate of the downlink physical layer data.

28. The method of claim 25, further comprising analyzing the organization of the physical layer data by identifying the at least one uplink channel.

29. The method of claim 28, wherein identifying the at least one uplink channel comprises:

retrieving a first uplink signal and a second uplink signal;

determining that the first uplink signal and the second uplink signal are similar based on cross-correlating the first uplink signal and the second uplink signal; and grouping the first uplink signal and the second uplink signal in a diversity pair based on determining that the first uplink signal and the second uplink signal are similar.

30. The method of claim 25, wherein determining that the downlink physical layer data is associated with the uplink physical layer data comprises:

transmitting test physical layer data to the baseband processing unit via the at least one uplink channel, and detecting that the downlink physical layer data from the baseband processing unit is received via the at least one downlink channel in response to transmitting the test physical layer data.

31. The method of claim 30, wherein transmitting the test physical layer data to the baseband processing unit comprises transmitting an uplink random access preamble message via a carrier signal of the at least one uplink channel.

32. The method of claim 25, further comprising transmitting test physical layer data to the baseband processing unit or the radio frequency processing unit, wherein the test physical layer data is formatted based on the physical layer data communicated between the baseband processing unit and the radio frequency processing unit, wherein diagnostics are performed based on a response from the baseband processing unit or the radio frequency processing unit.

33. The method of claim 24, further comprising:

extracting additional physical layer data communicated between the baseband processing unit and a distributed antenna system via the at least one downlink channel or the at least one downlink channel;

converting the extracted physical layer data to a first data format compatible for transmission to the distributed antenna system or a second format compatible for transmission to the baseband processing unit; and communicating the converted physical layer data to a unit of the distributed antenna system or the baseband processing unit.

34. The method of claim 24, further comprising:

emulating a source of digital signals in a standardized format, wherein the digital signals in the standardized format comprise data packets formatted according to a standardized communication protocol; and communicating the digital signals in the standardized format to a device configured to receive digital signals in the standardized format.

* * * * *